Figure 1:
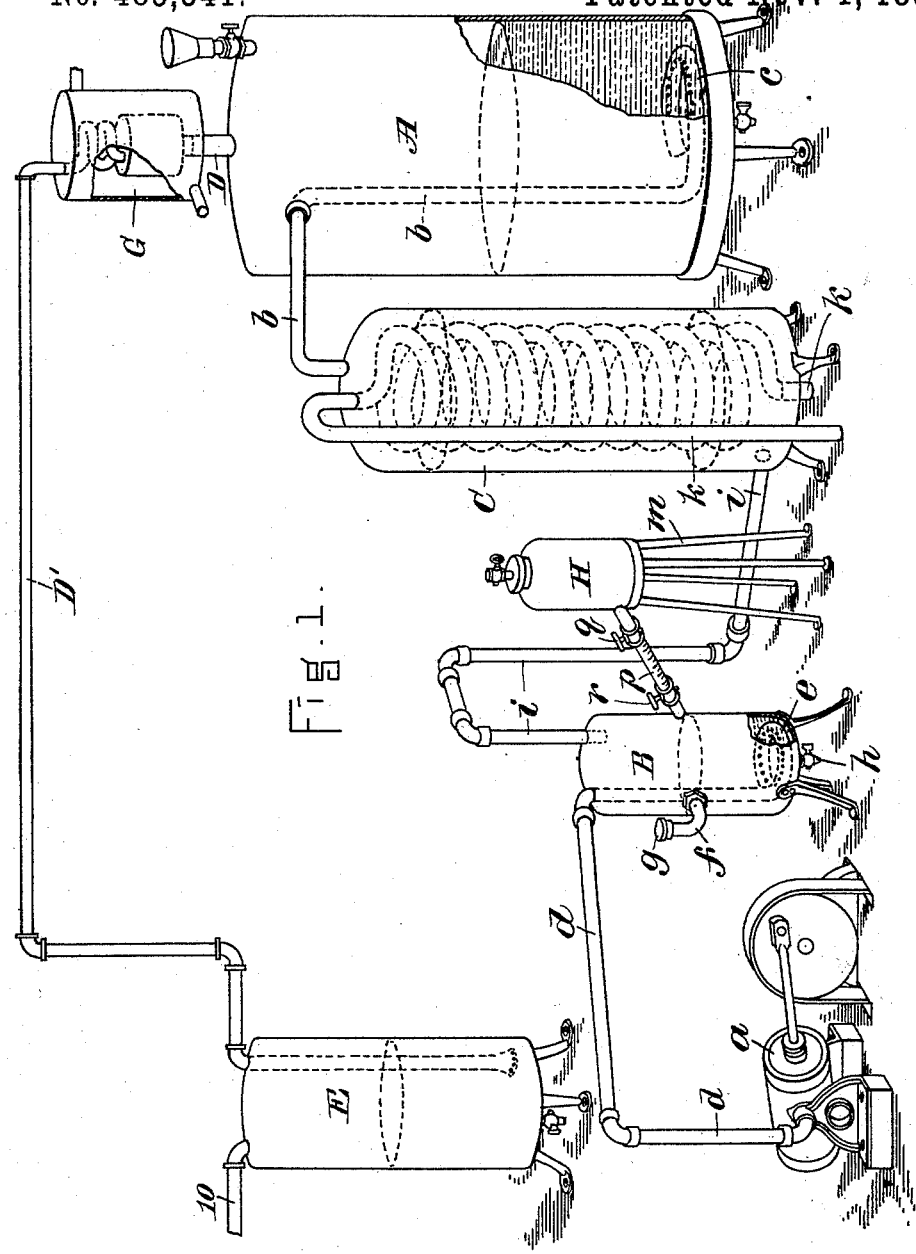

(No Model.) 2 Sheets—Sheet 1.

I. B. CUSHING.
PROCESS OF AND APPARATUS FOR PURIFYING AND MATURING LIQUORS OR DISTILLED SPIRITS.

No. 485,341. Patented Nov. 1, 1892.

WITNESSES.
R. Henry Marsh.
Harry H. Aiken.

INVENTOR.
Ira B. Cushing
by J. E. Teschemacher
Atty

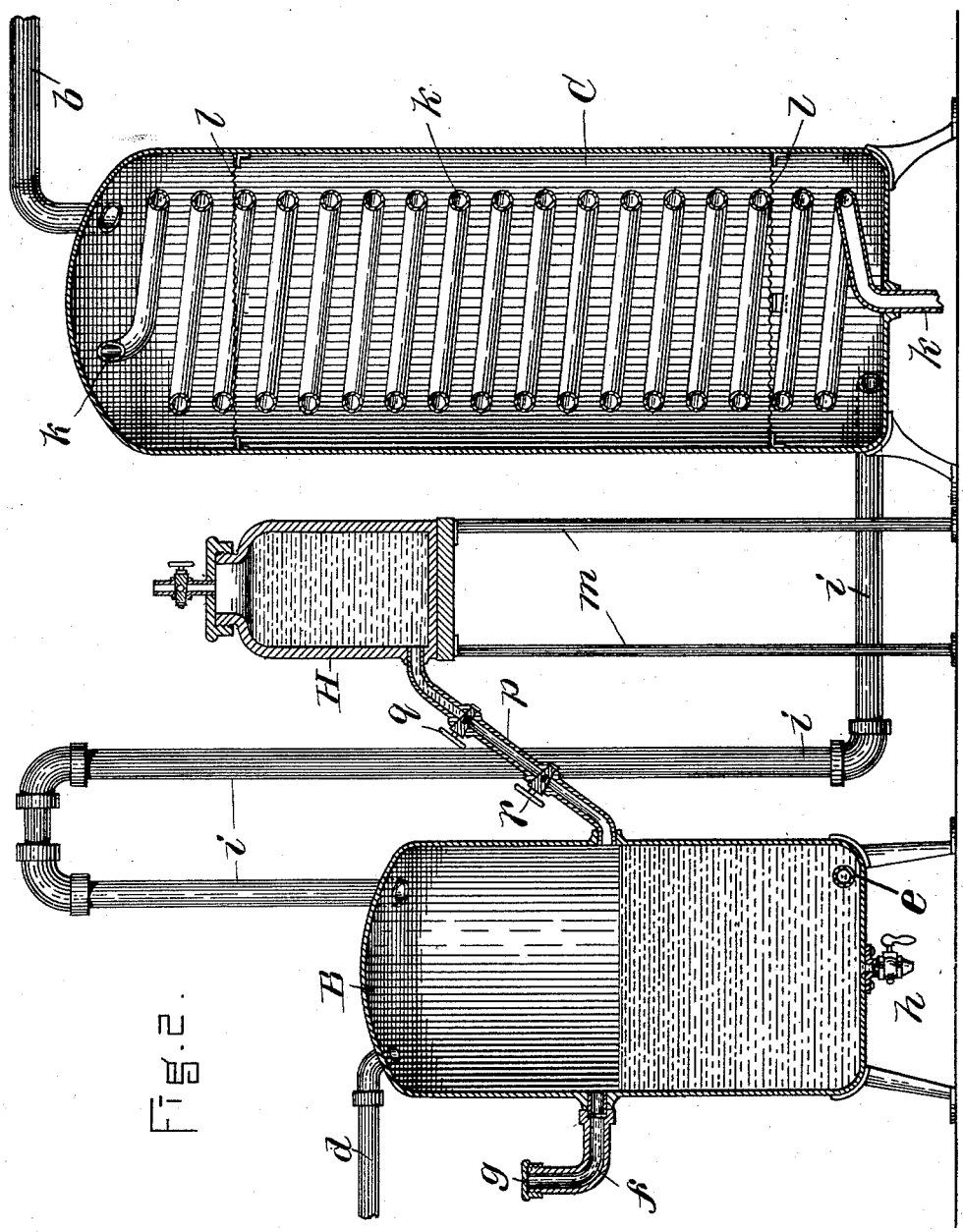

UNITED STATES PATENT OFFICE.

IRA B. CUSHING, OF BROOKLINE, MASSACHUSETTS.

PROCESS OF AND APPARATUS FOR PURIFYING AND MATURING LIQUORS OR DISTILLED SPIRITS.

SPECIFICATION forming part of Letters Patent No. 485,341, dated November 1, 1892.

Application filed January 13, 1892. Serial No. 417,984. (No model.)

*To all whom it may concern:*

Be it known that I, IRA B. CUSHING, a citizen of the United States, residing at Brookline, in the county of Norfolk and State of Massachusetts, have invented an Improved Process of and Apparatus for Purifying and Maturing Liquors or Distilled Spirits, of which the following is a full, clear, and exact description, reference being had to the accompanying drawings, making part of this specification, in which—

Figure 1 is a perspective view of my improved apparatus. Fig. 2 is an enlarged vertical section through a portion of the same.

My invention relates to an improvement on the process of and apparatus for purifying and maturing liquors or distilled spirits, for which Letters Patent of the United States No. 267,779 were granted to me November 21, A. D. 1882, and has for its object to render the said process still more perfect and also to materially shorten the time required in the operation of maturing the liquor. In my said patented process atmospheric air only, purified and heated, was forced through the liquor being treated for the purpose of eliminating the obnoxious gases—such as methane and carbon dioxide—and other impurities—such as aldehydes and volatile ethers—which not only render the liquor impure, but also prevent the proper oxidation of the fusel-oils in the process of maturing.

My present invention consists in commingling a suitable quantity of oxygen gas with the atmospheric air employed for treating the liquor, whereby the air which is disseminated through the liquor is energized or rendered more active for the purpose of rapidly oxidizing the fusel-oils into their flavoring-acids and the process of maturing the liquor thus accelerated and rendered more perfect than heretofore.

My invention also consists in the combination, with one of the closed tanks or vessels, which contains atmospheric air ready to be forced through the liquor to be treated, of a vessel or receptacle connected therewith by a suitable pipe provided with one or more valves or stop-cocks and adapted to contain either pure oxygen gas or a chemical substance which when combined with an alkaline solution or other liquid or substance in said air-tank will evolve oxygen gas, whereby at the commencement of the operation atmospheric air is forced through the liquor, as in my aforesaid patented process, for the purpose of removing the obnoxious gases and other impurities, and subsequently oxygen gas and atmospheric air, mixed together in the proper proportions, forced through the liquor being treated to more rapidly oxidize the fusel-oils into their flavoring-acids, as hereinafter more particularly set forth.

In the said drawings, A represents a closed tank or retort for containing the distilled spirits to be treated and through which is disseminated by means of a pipe *b*, provided at its lower end with a perforated enlargement or spreader *c*, a supply of atmospheric air previously purified and heated by being forced by means of a suitable air-pump *a* through a series of closed tanks or retorts B C, the latter being connected with the tank A by the said pipe *b*. The pump *a* is driven by steam or other suitable power and is provided with a suitable conducting-pipe *d*, which enters the tank B at its top and terminates near its bottom, where it is provided with a perforated enlargement or spreader *e*. The tank B contains an alkaline solution or other suitable liquid or substance, preferably a solution of permanganate of potash, adapted to purify and deodorize the air passing through it, thereby destroying any animalculæ or fermenting-germs which it may contain. This tank B is provided with a suitable supply-pipe *f*, through which the alkaline solution or other liquid or substance may be introduced, said pipe being provided with a screw cap or stopper *g*. At the bottom of the tank B is a faucet *h*, through which the liquid contents may be drawn off when desired. The air after being purified in the tank B is forced through a pipe *i* into the bottom of the tank C, which contains no water or other liquid, and is heated by means of a steam-pipe *k*, disposed in the form of a coil within said tank; but the tank C may be heated in any other suitable manner to warm the air passing through it. Extending across the interior of the tank C, near the top and bottom thereof, are two wire-gauze screens l l, (shown in Fig. 2,) which serve to divide the air into fine streams and retard its upward passage in order that it may be thoroughly heated by longer contact with the steam-pipe k. The purified air thus heated then passes by the pipe b into the tank A, which contains the distilled spirits to be treated, being discharged at the bottom of said tank through the perforated spreader c, previously referred to.

D D' are eduction-pipes connecting the spirit-tank A with another tank E, containing water for collecting the spirit which may pass over with the gases or vapors into the said tank, from which the air finally escapes into the atmosphere through a pipe 10. The eduction-pipes D D' are connected with a condenser G of any suitable construction, preferably one made like that described in Letters Patent of the United States No. 302,684, granted to me July 29, 1884, by means of which the valuable elements contained in the alcoholic vapors are condensed and caused to flow back into the tank A.

The apparatus thus far described is substantially the same as that described in my aforesaid patent, No. 267,779, and forms no part of my present invention, its construction and mode of operation being briefly referred to in order to more clearly illustrate the improvements which form the subject of the present invention, and which will now be particularly described.

H is a closed tank or vessel, which rests on a suitable support m, by which it is elevated above the bottom of the tank B, said tank H being connected with the tank B by a downwardly-inclined pipe p, preferably composed of glass or other suitable material adapted to resist chemical action, said pipe entering the tank B above the level of the liquid or substance contained therein, and being provided with two valves or stop-cocks q r. This tank H contains either pure oxygen gas or a substance—for instance, peroxide of hydrogen—which when mixed with the alkaline or other liquid or solid contents of the tank B will slowly evolve oxygen gas, it being necessary to guard against the passage of too great a volume of oxygen gas into the liquor at one time, as this would oxidize the ethylic alcohol and produce vinegar. When the vessel H is intended to contain pure oxygen gas only, the pipe p will require only a single valve or stop-cock; but where said vessel is intended to contain a liquid adapted to evolve oxygen gas by contact with the contents of the tank B, I prefer to provide the pipe p with two valves or stop-cocks q r, as shown, whereby the portion of the pipe p between the said valves, which may be graduated, if desired, is adapted to form a measure for containing the proper quantity of liquid to be admitted at one time into the tank B, it being merely necessary to close the upper valve q and open the lower one r, when the exact quantity of liquid required will flow into the tank B, and in this manner the evolution of the oxygen gas can be controlled and regulated with perfect ease. At the commencement of the operation, the lower valve r in the pipe p being closed, purified air alone is forced by the pump a, as in my previously-patented process, from the tank B through the pipe i, tank C, and pipe b, into the tank A, where it is disseminated through the liquor or spirits therein for the purpose of removing the obnoxious gases, such as methane, carbon dioxide, and other impurities, such as aldehydes and volatile ethers. This operation is continued for a given time or until the obnoxious gases and impurities have been removed from the spirits, when either pure oxygen gas is permitted to flow from the vessel H into the tank B, through the pipe p, or a substance—for instance, peroxide of hydrogen—which when combined with the alkaline or other contents of the tank B will slowly evolve oxygen gas. This oxygen gas, mixed with the purified air in the tank B, is then forced over through the pipe i, warming-tank C, and pipe b into the tank A and disseminated through the spirits therein, the oxygen gas energizing the air and rendering it much more active for the purpose of accelerating the oxidation of the fusel-oils into their flavoring-acids, the process being in this manner perfected and the time occupied in maturing the spirits materially shortened.

What I claim as my invention, and desire to secure by Letters Patent, is—

1. The herein-described process of purifying and maturing liquors or distilled spirits, which consists in first forcing atmospheric air alone through the spirits being treated for the purpose of removing therefrom the obnoxious gases and other impurities, then commingling in a separate vessel oxygen gas with the unused atmospheric air employed in the process, whereby it is energized and rendered more active, and then forcing the atmospheric air and oxygen so commingled through the spirits being treated and permitting the same to escape after its passage through the liquor, substantially as and for the purpose set forth.

2. In an apparatus for maturing liquors or distilled spirits, the combination, with the tank B, adapted to contain atmospheric air to be forced through the spirits to be treated, and an alkaline solution or other suitable liquid or substance adapted to purify and deodorize the air passing through it, of a tank or vessel H, adapted to contain oxygen gas or a substance, such as peroxide of hydrogen, which when introduced into the tank B and mixed with the contents thereof will evolve oxygen gas therein, and a connecting-pipe P, provided with suitable means, substantially as shown and described, for regulating and controlling the passage of the oxygen gas or gas-producing substance from the vessel H to the tank B, all operating substantially in the manner and for the purpose set forth.

Witness my hand this 8th day of January, A. D. 1892.

IRA B. CUSHING.

In presence of—
   P. E. TESCHEMACHER,
   HARRY W. AIKEN.